(12) United States Patent
Olmstead

(10) Patent No.: US 10,630,959 B2
(45) Date of Patent: Apr. 21, 2020

(54) SYSTEM AND METHOD FOR OBJECT COUNTING AND TRACKING

(71) Applicant: Datalogic USA, Inc., Eugene, OR (US)

(72) Inventor: Bryan L. Olmstead, Eugene, OR (US)

(73) Assignee: DATALOGIC USA, INC., Eugene, OR (US)

( * ) Notice: Subject to any disclaimer, the term of this patent is extended or adjusted under 35 U.S.C. 154(b) by 206 days.

(21) Appl. No.: 15/208,467

(22) Filed: Jul. 12, 2016

(65) Prior Publication Data

US 2018/0018788 A1 Jan. 18, 2018

(51) Int. Cl.
| | |
|---|---|
| *H04N 13/204* | (2018.01) |
| *G06K 9/00* | (2006.01) |
| *G06T 7/00* | (2017.01) |
| *H04N 5/232* | (2006.01) |
| *G06T 7/62* | (2017.01) |
| *G06T 7/50* | (2017.01) |
| *G06T 7/11* | (2017.01) |
| *G06K 9/32* | (2006.01) |

(52) U.S. Cl.
CPC ....... *H04N 13/204* (2018.05); *G06K 9/00201* (2013.01); *G06K 9/00624* (2013.01); *G06K 9/32* (2013.01); *G06T 7/001* (2013.01); *G06T 7/0008* (2013.01); *G06T 7/11* (2017.01); *G06T 7/50* (2017.01); *G06T 7/62* (2017.01); *H04N 5/232* (2013.01); *G06T 2207/10016* (2013.01); *G06T 2207/10028* (2013.01); *G06T 2207/30128* (2013.01); *G06T 2207/30242* (2013.01)

(58) Field of Classification Search
CPC ....... G06T 7/60; G06T 7/0081; G06T 7/0051; G06K 9/00624; H04N 13/0203
USPC ........... 348/135, 143, 150, 46; 382/181–189, 382/224; 345/426, 424, 419; 707/709; 705/23; 235/440, 383; 356/326; 342/454
See application file for complete search history.

(56) References Cited

U.S. PATENT DOCUMENTS

| | | | | |
|---|---|---|---|---|
| 6,069,696 | A | * | 5/2000 | McQueen .......... G01G 19/4144 235/383 |
| 8,448,859 | B2 | * | 5/2013 | Goncalves ......... G06K 9/00771 235/383 |
| 9,087,258 | B2 | * | 7/2015 | Yu .......................... H04N 7/181 |
| 9,152,828 | B2 | | 10/2015 | Goncalves et al. |

(Continued)

FOREIGN PATENT DOCUMENTS

WO    WO 2004/114648 A2    12/2004

*Primary Examiner* — Paulos M Natnael
*Assistant Examiner* — Sean N. Haiem
(74) *Attorney, Agent, or Firm* — Stoel Rives LLP

(57) ABSTRACT

Disclosed systems and methods for detecting and tracking a quantity of items in a particular location by optical means. The system includes an imager having a field of view directed over a region of interest where the items to be tracked are located, the imager being operable to acquire images of the items. The system further includes a controller in operative communication with the imager, where the controller acquires depth data from the images and determines volume measurements based on the depth data. Based on the determined volume measurements, the system is capable of counting and tracking the items present in the region of interest using optical means to avoid relying on barcodes or other identifier information affixed to the items.

20 Claims, 4 Drawing Sheets

(56) References Cited

U.S. PATENT DOCUMENTS

| | | | | |
|---|---|---|---|---|
| 2003/0112237 A1* | 6/2003 | Corbetta | ............... | G06T 15/60 |
| | | | | 345/426 |
| 2004/0125103 A1* | 7/2004 | Kaufman | ............... | G06T 15/06 |
| | | | | 345/419 |
| 2005/0257748 A1* | 11/2005 | Kriesel | ............... | A01K 11/008 |
| | | | | 119/51.02 |
| 2006/0187120 A1* | 8/2006 | Ohba | ............... | G07C 9/00 |
| | | | | 342/454 |
| 2012/0179665 A1* | 7/2012 | Baarman | ............ | G06F 19/3475 |
| | | | | 707/709 |
| 2014/0052555 A1* | 2/2014 | MacIntosh | ........... | G06Q 20/208 |
| | | | | 705/23 |
| 2014/0139633 A1* | 5/2014 | Wang | ............... | G06K 9/00201 |
| | | | | 348/46 |
| 2015/0022522 A1* | 1/2015 | Li | ............... | G06T 19/00 |
| | | | | 345/424 |
| 2015/0310601 A1* | 10/2015 | Rodriguez | ........... | G06T 1/0007 |
| | | | | 348/150 |
| 2016/0150213 A1* | 5/2016 | Mutti | ................. | G06T 7/0085 |
| | | | | 348/143 |

\* cited by examiner

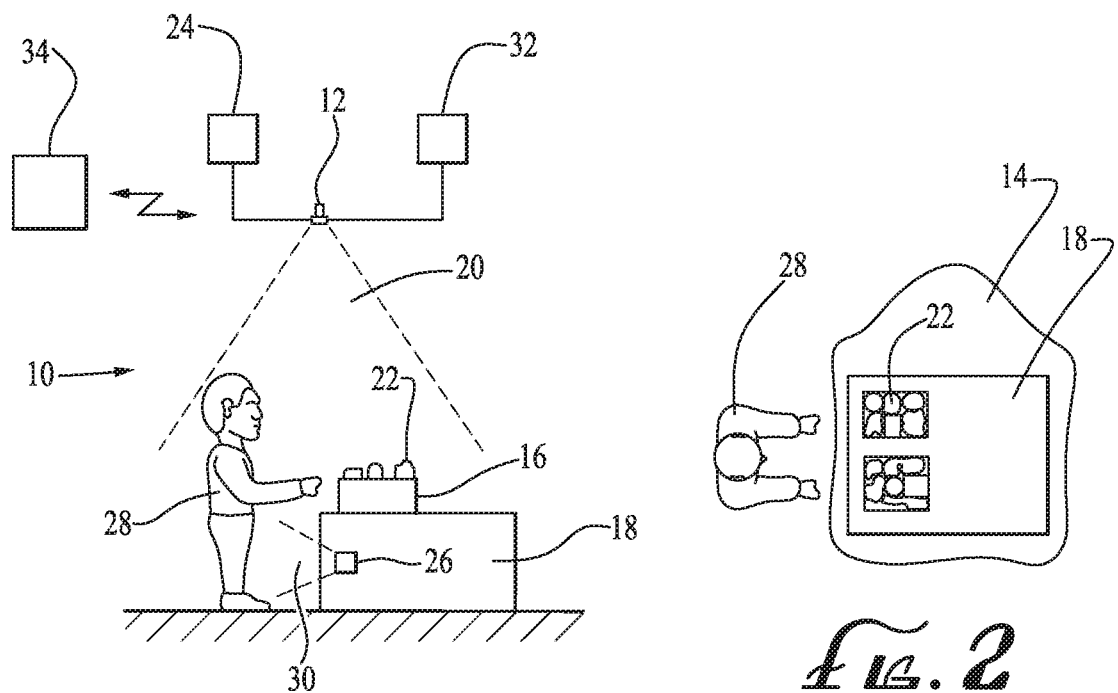
fig.1
fig.2
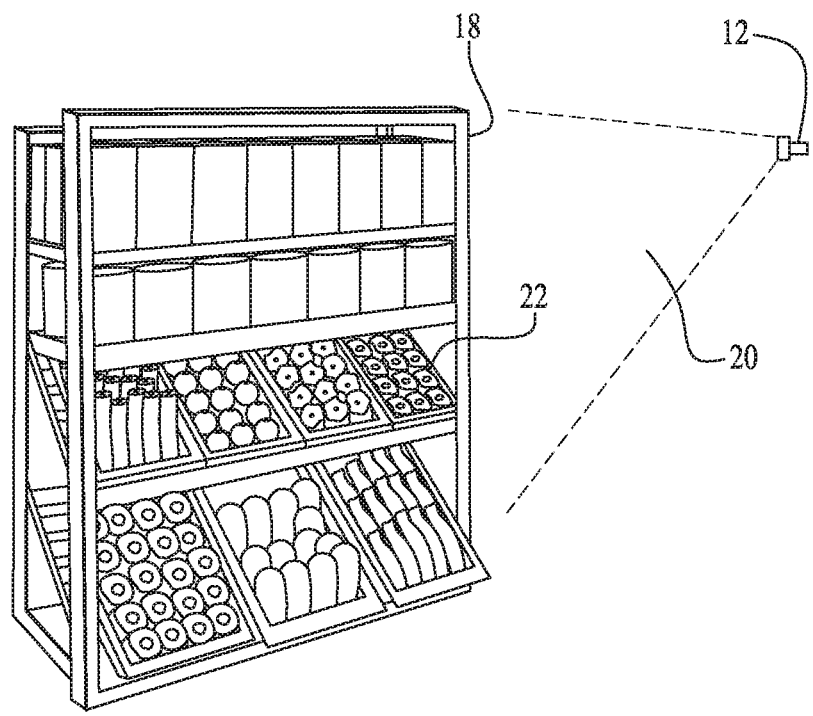
fig.3

SYSTEM AND METHOD FOR OBJECT COUNTING AND TRACKING

BACKGROUND

The field of the disclosure relates generally to object recognition systems, and in particular, to such systems capable of detecting and tracking a quantity of items in a particular location using optical means. In some embodiments, such systems may be useful to track items and improve inventory techniques in the grocery and retail environment.

In many conventional grocery and retail establishments, items for sale typically include identifiers printed on or otherwise affixed to the items, such as optical codes, barcodes, RFID tags, or other suitable machine-readable indicia. These identifiers carry a variety of item-specific information, such as item identification, price, SKU information, etc. In many instances, these identifiers are used not only during a retail checkout process to tally items for payment, but also as a means for managing inventory by tracking sales, movement, and/or removal of items from the retail establishment.

For certain items, such as produce, it may be fairly expensive and/or time-consuming to affix an identifier to each individual item, or it may be challenging in some instances to do so based on the size, shape, and characteristics of the items (e.g., wet or waxy skins, irregular shapes, etc.). Moreover, in many instances where the identifiers (e.g., stickers and labels) remain affixed to the item, they are usually small and difficult to read with current scanning equipment or other related methods. Accordingly, it is generally difficult to precisely count and track produce and other similar items with conventional tools and methods.

The present inventor has therefore recognized a need for improved object recognition systems and methods, such systems and methods providing improved counting and tracking capabilities without reliance on barcodes or other identifiers affixed to the object. Additional aspects and advantages will be apparent from the following detailed description of example embodiments, which proceeds with reference to the accompanying drawings.

Understanding that the drawings depict only certain embodiments and are not, therefore, to be considered limiting in nature, these embodiments will be described and explained with additional specificity and detail with reference to the drawings.

BRIEF DESCRIPTION OF THE DRAWINGS

FIG. 1 schematically illustrates a side view of an object recognition system arranged with its field of view monitoring a region of interest containing target items being tracked.

FIG. 2 schematically illustrates a top view of the object recognition system of FIG. 1.

FIG. 3 illustrates an example embodiment of an alternative display arrangement for the target items that may be monitored via the object recognition system of FIG. 1.

DETAILED DESCRIPTION OF EXAMPLE EMBODIMENTS

Figure 4:
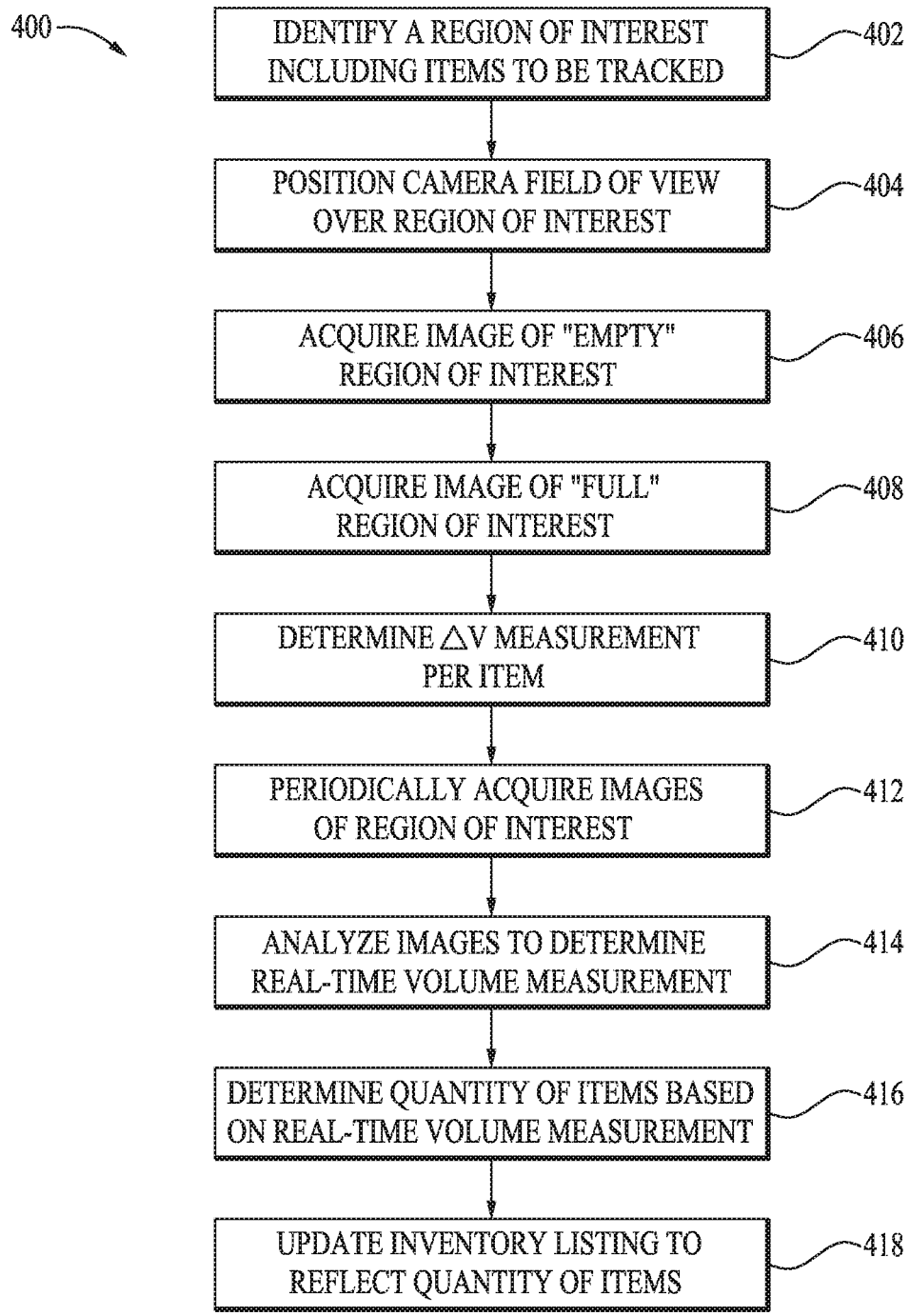
FIG. 4 is a flow chart illustrating one example method for counting and tracking objects using an object recognition system.

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

In the following description of the figures and any example embodiments, the system may be referred to in conjunction with use at a retail establishment. It should be understood that such use is merely one example use for such a system. Other uses for a system with the characteristics and features described herein may be implemented, for example, in an industrial location for processing inventory, as well as other suitable environments for tracking and counting inventory items.

Collectively, FIGS. 1-9 illustrate embodiments of an object detection or recognition system 10 that may be used in a grocery (or other retail) establishment, such as in a supermarket, to detect a quantity of items in a particular location by optical means. In some embodiments, the object recognition system 10 may be used to count and track grocery items 22, such as produce, for inventory purposes without reliance on a barcode or other identifier affixed to the item 22.

For example, with general reference to FIG. 1, the object recognition system 10 includes a camera (or other suitable imager) 12 arranged with its field of view 20 overlapping a region of interest 14 where the items 22 are located. In an example operation, camera 12 obtains or otherwise acquires images of the region of interest 14. A processor (or other subsystem) 24 analyzes the acquired images and calculates a volume measurement for the items 22 located in the region of interest 14. The volume measurement may be obtained in a variety of methods, such as by calculating the sum of the depth pixels over the region of interest 14. Thereafter, the measured volume may be compared to a measured baseline measurement (e.g., a baseline volume for a known quantity of items 22 in the region of interest 14) to determine a variance or change in volume over time, where the variance may be indicative of changes in the number of items 22 located within the region of interest 14. Using a conversion calculation described below, the variance in volume may be directly correlated with a change in the quantity of items 22 present in the region of interest 14. Additional details of these and other embodiments of the object recognition system 10 are described below with reference to the figures.

FIGS. 1 and 2 are schematic illustrations of an object recognition system 10 operable for tracking and counting items 22 located within a region of interest 14. With collective reference to FIGS. 1 and 2, the object recognition system 10 includes a camera 12 operable for acquiring one or more images of the items 22 located on a display stand or unit 18. In some embodiments, the camera 12 may employ range imaging techniques, such that the images acquired by the camera 12 have pixel values that correspond to distance dimensions, which may be used in the object recognition techniques as further explained in detail below.

In some embodiments, the items 22 may be grouped with similar items, such as by placing like items 22 in a box or other container 16. This arrangement may help the object recognition system 10 identify movement of particular items 22 located within a region of interest 14 that may include multiple different items 22. As is further detailed below with reference to FIGS. 4 and 6-9, and the accompanying discussion, the images may be analyzed to create a depth profile or map of the items 22 in the region of interest, where the depth profile is used to determine changes in volumetric measurements over time to track a change in the quantity of items 22.

As illustrated in FIGS. 1 and 2, in one embodiment, the camera 12 may be arranged in an overhead configuration with a field of view 20 directed generally downwardly toward the region of interest 14. In other embodiments, the display 18 may be arranged differently. For example, with reference to FIG. 3, the display 18 may be an upright shelving unit with a variety of different grocery items 22 arranged in separate compartment. The camera 12 (not shown) may be positioned overhead as in FIGS. 1 and 2 while still being able to capture images of all the items 22, or may be arranged sidewardly with its field of view overlapping the items 22. In some embodiments, such as those including a variety of different items 22, visual cues/features for the items 22 and/or their respective location on the display 18 may be used by the object recognition system 10 to identify and track the particular items 22 as is further explained with reference to FIG. 4 below. It should be understood that regardless of the arrangement of the items 22 and the display 18, the camera 12 may be correspondingly aligned such that its field of view 20 sufficiently overlaps with the region of interest 14 whereat the items 22 to be tracked and counted are located to ensure that the acquired images properly capture the items 22.

The cameras 12 may operate in accordance with a number of different ranging techniques. For example, the depth information may be measured using a standard time-of-flight (ToF) technique, where the camera 12 captures a scene in three dimensions. With this technique, a short laser pulse illuminates a scene, and the intensified CCD camera opens its high speed shutter for a short time (e.g., a few hundred picoseconds). The three-dimensional information is calculated from a two-dimensional image series that was gathered with increasing delay between the laser pulse and the shutter opening. Other range-camera operating techniques may be employed, such as stereo triangulation, where the depth data of the pixels is determined from data acquired using a stereo or multiple-camera setup system; interferometry, where the depth data may be obtained by illuminating points with coherent light and measuring the phase shift of the reflected light relative to the light source; or other suitable techniques not particularly mentioned herein.

In some embodiments, the camera 12 includes a processor 24 (or is otherwise in operable communication with a remote controller/processor) which, among other functions, is programmed to: (1) control operating parameters of the camera 12; (2) to analyze the acquired images of the items 22; and (3) to determine/compare the volumetric measurements in the region of interest 14 as discussed in further detail below. The processor 24 may comprise any suitable digital processor, such as a low-power DSP core or ARM core processor. In some embodiments, processor 24 comprises an ARM9 processor AT91SAM9G20 sold by Atmel of San Jose, Calif., USA, or OMAP processor sold by Texas Instruments of Dallas, Tex., USA or an i.MX1 series processor (such as the MC9328MX1 processor) sold by Freescale Semiconductor, Inc. of Austin, Tex., USA. Alternately, multiple processors, micro-processors, sub-processors or other types of processor electronics such as comparators or other specific function circuits may be used alone or in combination. For the purposes of this description, the term processor is meant to include any of these combinations.

As noted previously, in some embodiments, the camera 12 may obtain or acquire images of the items 12 based on an interval cycle, such as after a predetermined amount of time has elapsed (e.g., every five minutes, or every 15 minutes, or every hour, etc.). In other embodiments, to conserve power, the camera 12 may instead be in an inactive state (e.g., a standby mode) or may simply not run any image-acquisition protocols until the camera 12 receives a signal that a person is at or near the display 18. For example, returning to FIG. 1, the object recognition system 10 may include a sensor system 26 in communication with the camera 12 (and/or the processor 24 or other subsystem of the camera 12), where the sensor system 26 is operable to detect the presence of a person 28 within its activation field 30. In some embodiments, the sensor system 26 may include one or more sensors positioned adjacent the display 18. The one or more sensors of the first sensor system 26 may include optical sensors, infrared sensors, acoustics sensors, pressure sensors or any other suitable sensor configured to detect the presence of person 28. When the sensor system 26 detects the person 28, the sensor system 26 may generate an activation signal, which may signal the camera 12 to initiate an image-capture sequence. In other embodiments, the sensor system 26 may instead be incorporated into the camera 12, where the field of view 20 of the camera 12 essentially overlaps the activation field 30 of the sensor system 26.

In still other embodiments, the camera 12 may delay the image-capture sequence until receiving a second signal from the sensor system 26 indicating that the person is no longer within the activation field 30. This arrangement may allow the camera 12 to obtain an unobstructed image of the region of interest 14 and avoid having the person 28 potential obscure the items 22, and/or may avoid having the camera 12 inadvertently capture and account for the person 28 or an item belonging to the person 28 (e.g., a cup, purse, or other personal item) left near the items 22 as part of the items 22 to be tracked.

In some embodiments, the camera 12 may include a memory module 32, which may be implemented using one or more suitable memory devices, such as RAM and ROM devices, secure digital (SD) cards, or other similar devices. In one embodiment, any number of protocols/instructions may be stored in the memory unit 32, including operating systems, application programs, and volumetric calculations or calibration protocols. The memory module 32 may also store the images acquired by the camera 12 of the items 22 and/or may store inventory information of the items 22 as determined using volumetric measurement techniques described in further detail below.

In some embodiments, the camera 12 may also include a network interface to facilitate communication with one or more peripheral devices or systems 34, such as a database/server, a mobile device, a computer, or any other suitable device. Connection with the peripheral devices or systems 34 may be used to communicate with and/or receive information from the camera 12. For example, in some embodiments, the camera 12 may regularly push inventory information related to the items 22 to a computer system or handheld device to communicate such information with store or other personnel.

The network interface may facilitate wired or wireless communication with other devices over a short distance (e.g., Bluetooth™) or nearly unlimited distances (e.g., via the Internet). Preferably, the camera 12 uses a wireless connection, which may use low or high powered electromagnetic waves to transmit data using any wireless protocol, such as Bluetooth™, IEEE 802.11b (or other WiFi standards), infrared data association (IrDa), and radio frequency identification (RFID). In the case of a wired connection, a data bus may be provided using any suitable protocol, such as IEEE 802.3 (Ethernet), advanced technology attachment (ATA), personal computer memory card international association (PCMCIA), and USB.

FIG. 4 is a flow chart illustrating a method 400 for counting and tracking objects using the object recognition system 10 as described with reference to FIGS. 1-3. In conjunction with FIG. 4, FIGS. 6-9 provide additional details for calculations and analysis methods performed by the object recognition system 10 (e.g., such as via the processor 24, the peripheral device 32, or any other suitable subsystem) to count items 22.

Before proceeding with details relating to particular calculation and analysis methods, the following provides a brief overview of the general concept of volumetric calculations using the 3D camera. As a general matter, one challenge with using an overhead 3D camera configuration as illustrated in FIG. 1 is that the camera is measuring the distance from itself to the objects. The total volume measured by the camera is actually the volume of empty space between the camera and the target items, specifically along a generally pyramid-shaped trajectory that defines the field of view of the camera (see FIGS. 6-9). The total volume may be calculating using a depth profile, a mapping of depth pixels in an x-y coordinate system as measured by the camera. This total volume, when calculated from the depth maps, is typically measured in cubic pixels, with each pixel "seeing" an area of 1×1 pixels. The depth may be measured in any one of variety of units, such as meters, least significant bits (LSBs), or other suitable units. The total volume is the sum of the individual distance measurements across a desired portion of the image, referred to as the region of interest in the context of the written description. The following provides a more detailed description of the calculation and analysis methods used by the object recognition system.

With reference to FIG. 4, at step 402, a region of interest is identified, the region including the items/objects to be counted, such as a box of apples. Once the region of interest is identified, at step 404, the camera is positioned with its field of view arranged to overlap the identified region of interest and the items/objects. As noted previously, although much of the description herein references the camera positioned in an overhead configuration, the camera may be arranged at different viewing configurations other than in an overhead arrangement in other embodiments.

Figure 6:
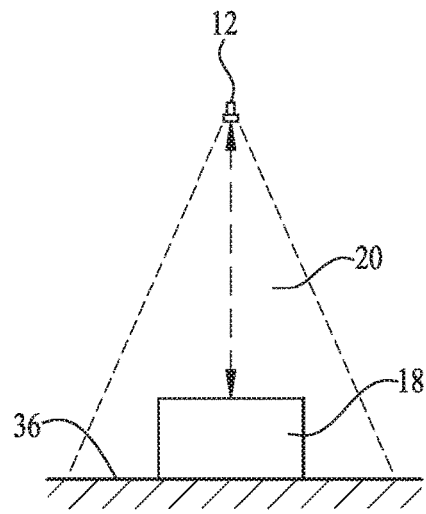
FIG. 6 schematically illustrates an arrangement of the region of interest for determining a first baseline volumetric measurement using the object recognition system of FIG. 1.
Figure 7:
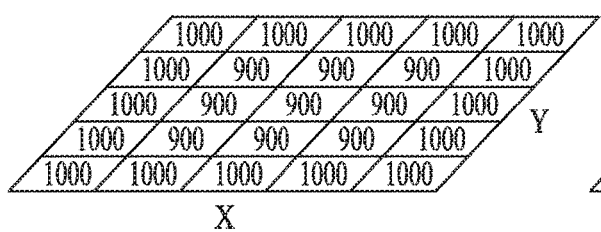
FIG. 7 is a depth profile representing depth measurements for the first baseline volumetric measurement based on the arrangement of FIG. 6.

At step 406, to calibrate the object recognition system and determine a baseline volume measurement for comparison to the total volume calculated at various points in time, the camera may first acquire an image of a baseline region of interest, that is, an image of the region of interest having a known quantity of items (e.g., apples). As a frame of reference, the following description specifies the baseline region of interest as an "empty" region of interest having no apples, but it should be understood that in other embodiments the baseline measurement may be determined when the region of interest is full, or otherwise has a known quantity of items present. With particular reference to FIGS. 6 and 7, the following describes additional detail for determining a baseline volume measurement of the "empty" region of interest.

FIG. 6 is a schematic of the object recognition system 100 arranged in a similar fashion as illustrated in FIG. 1, with the camera 12 positioned overhead and having a pyramid-shaped field of view 20 projecting downwardly therefrom. With reference to FIG. 6, the camera 12 obtains an image of the region of interest from which is generated a depth profile or map, D(x,y) (see FIG. 7) measuring the depth from the camera 12 to any object located in the region of interest, where x and y represent pixel coordinates in the map. For example, with reference to FIGS. 6 and 7, the "empty" region of interest includes a display stand or table 18 on a floor 36. Suppose the floor is 1000 cm away from the camera 12 and the table is 100 cm tall, which equates to the table being 900 cm away from the camera 12. In this scenario, the generated depth profile or map would result in the mapping illustrated in FIG. 7, with the "1000" value representing the distance from the camera 12 to the floor 36, and the "900" value representing the distance from the camera 12 to the table 18.

From the depth profile, the object recognition system 10 (or a processor 24 thereof) calculates the total volume for the baseline or "empty" region of interest using the following equation:

$$V_{base} = \Sigma_x \Sigma_y D(x,y) \quad (1)$$

where the total volume of the baseline region of interest, $V_{base}$, is measured as the sum of all the depths from the all the x-y pixel coordinates. In some embodiments, the summation may be computed as follows:

```
sum=0
for x=0 to max x in image
    for y=0 to max y in image
        sum = sum + D(x,y)
    end
end
volume = sum
```

After the $V_{base}$ is measured, the camera, at step 408, next determines a second volumetric measurement for the region of interest having a second known quantity of items. For reference purposes, the following example refers to this as a "full" region of interest, that is, the display being full of apples. It should be understood, however, the in other embodiments, the region of interest may not be entirely full, but rather contain a second known quantity of items different from the number of items in the baseline measurement. At step 408, the camera acquires an image of a "full" region of interest to determine a volume measurement $V_{full}$ in a similar fashion as described previously with respect to step 406.

Figure 8:
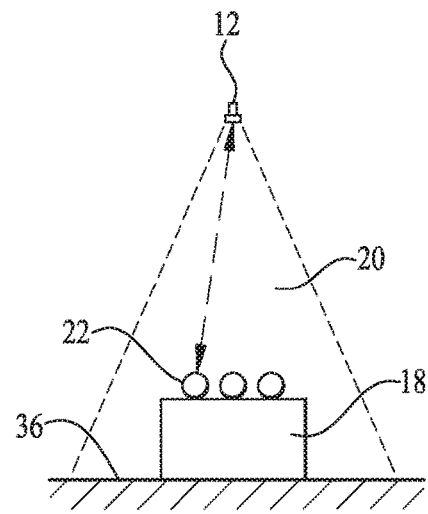
FIG. 8 schematically illustrates an arrangement of the region of interest for determining a second baseline volumetric measurement using the object recognition system of FIG. 1.
Figure 9:
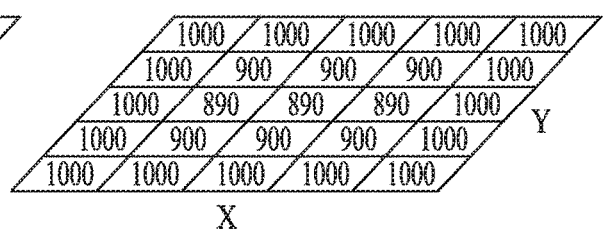
FIG. 9 is a depth profile representing depth measurements for the second baseline volumetric measurement based on the arrangement of FIG. 8.

Briefly, with reference to FIG. 8, the camera 12 obtains an image of the region of interest from which is generated a depth profile or map, D(x,y) (see FIG. 9). Supposing that each of the items 22 is approximately 10 cm tall, the depth map will reflect the position of the items 22 in the x-y coordinate system as being 890 cm away from the camera 12. Accordingly, the depth map reflects a "1000" value to represent the distance from the camera 12 to the floor 36, a "900" value to represent the distance from the camera 12 to the table 18, and "890" to represent the distance from the camera 12 to the apples 22.

From the depth profile, the object recognition system 10 calculates the total volume for the "full" region of interest using the following equation:

$$V_{full} = \Sigma_x \Sigma_y D(x,y) \quad (2)$$

where the total volume of the "full" region of interest, $V_{full}$, is measured as the sum of all the depths from the all the x-y pixel coordinates in a similar fashion as described previously.

With these baseline volume measurements determined at steps 406 and 408, at step 410, the object recognition system determines a value for a change in volume, ΔV, per item using the following relationship:

$$\Delta V = \frac{V_{full} - V_{base}}{N} \quad (3)$$

where N is the number of items in the "full" region of interest, that is, when the box of apples is full in the above example. Based on equation (3), the object recognition system is able to associate a measured change in volume as determined using the 3D camera and image analysis to an actual quantity of items, i.e., the number of apples remaining in the box of apples. Essentially, equation (3) embodies the concept that changes in the measured total volume of the region of interest as captured in the images indicates that a certain quantity of items may have been removed. By quantifying such changes into volumetric measurements, and associating such volumetric measurements to a known quantity of items, it is possible to monitor and track the current quantity of items in the region of interest by optical means as described in further detail below.

With the volume measurements determined from steps 406, 408, and 410, at step 412, the camera monitors the region of interest and periodically acquires images of the items. In some embodiments, the images may be acquired in accordance with a programmed protocol, such as a predetermined time cycle (e.g., every ten minutes, or every half hour). In other embodiments, the camera may acquire images in response to detection of a person near the region of interest, such as by a sensor system as described previously, or at any other desired intervals.

Once the images are acquired, at step 414, the images are analyzed and a real-time volume measurement, $V_{RT}$, is determined therefrom. The $V_{RT}$ is determined using a similar depth map analysis and summation calculation described previously with reference to FIGS. 6-9. The calculation may be determined as follows:

$$V_{RT} = \Sigma_x \Sigma_y D(x,y) \quad (4)$$

Based on the $V_{RT}$, at step 416, the object recognition system determines a current quantity of items, n, remaining in the region of interest based on the volumetric measurements derived at steps 406, 408, and 410 with the following relationship:

$$n = \frac{V_{RT} - V_{base}}{\Delta V} \quad (5)$$

The following provides a brief example illustration of the calculation process described by method 400. For example, assume $V_{base}$=10,000 and $V_{full}$=8,800, where $V_{full}$ was calculated with three apples in the region of interest. Then, using equation (3), the ΔV per item is −400, with the negative number simply reflecting the point of the view of the overhead camera. With the calibration process complete, the camera periodically obtains and analyzes images of the region of interest. Assuming at a first time, $t_1$, the camera obtains a first image and the $V_{RT}$ is calculated to be 9200 using equation (4). Substituting these values into equation (5), we determine that n=2, meaning that two items remain in the region of interest at the first time, $t_1$, based on the measured $V_{RT}$.

In some embodiments, equation (5) may be rounded to the nearest whole number to account for an assumption that all items are substantially the same volume and to account for potential measurement error. For example, assuming the calculation in equation (5) returns an n=2.3. The calculation may be rounded to the nearest whole number, n=2. Similarly, if the calculation returned n=1.7, then the calculation may be rounded upward to n=2.

The method 400 illustrates an example embodiment of an object recognition system for detecting and tracking a quantity of items in a region of interest. In such embodiments, the items in the region of interest may all be the same. For example, in the embodiment described above, the items were all apples. Accordingly, the object recognition system is able to rather easily associate a change in the number of items (as calculated by equation (5)) as reflecting a change in the number of apples that the retail establishment may have in its inventory. In other embodiments, however, the region of interest may include a plurality of different items (e.g., apples, pears, oranges, lettuce, onions, etc.) that are being simultaneously tracked by the object recognition system, such as the embodiment illustrated in FIG. 3. In such embodiments, a method 500 may be used to detect and track not only whether an item has been removed from the display, but may also identify which item has been removed as further described in detail below.

Figure 5:
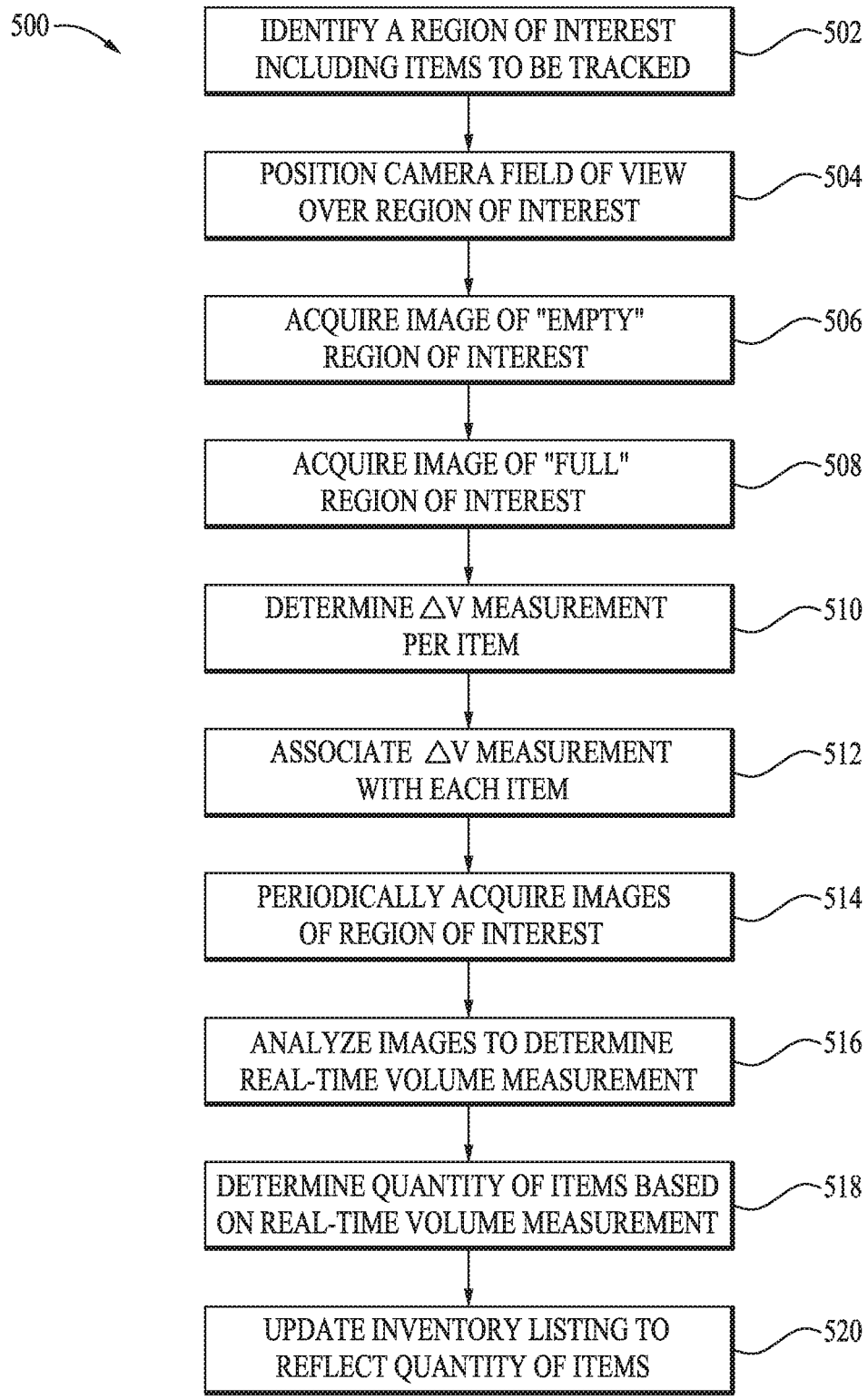
FIG. 5 is a flow chart illustrating another example method for counting and tracking objects using an object recognition system.

FIG. 5 is a flow chart illustrating a method 500 for counting and tracking objects using an object recognition system. Many of the steps in the method 500 may be the same or substantially similar as the corresponding steps in the method 400. Accordingly, in FIG. 5, reference numbers having the same final two digits as those in FIG. 4, identify analogous or similar steps. For example, method step 402 may be the same or substantially similar as method step 502. To avoid repetition and potentially obscuring more pertinent aspects of the embodiment, some detail of these steps may not be further described with the understanding that a similar process or method may occur as described with the analogous step described in FIG. 4.

In step 502, a region of interest is identified, the region including the items/objects to be counted. Once the region of interest is identified, at step 504, the camera is positioned with its field of view arranged to overlap the identified region of interest and the objects. At step 506, the object recognition system is calibrated by acquiring an image of a baseline or "empty" region of interest. In some embodiments, this step may be performed separately for each discrete type of item from among the different items to obtain the baseline volume measurement of the "empty" region of interest, $V_{base}$, for each item. Similarly, at step 508, the camera acquires images of a "full" region of interest, which may be performed separately for each discrete type of item to obtain a volume measurement of the "empty" region of interest, $V_{full}$. The calculations for $V_{base}$ and $V_{full}$ may be obtained in a similar fashion as described previously with respect to equations (1) and (2) of method 400.

With these baseline volume measurements determined at steps 506 and 508, at step 510, the object recognition system determines a value for a change in volume, $\Delta V$, per item using the following relationship:

$$\Delta V = \frac{V_{full} - V_{base}}{N} \quad (6)$$

where N is the number of items in the "full" region of interest. The system may determine this relationship for each of the different items.

At step 512, the system associates the calculated $\Delta V$ measurement from equation (6) with each of the distinct items so that the system is able to track each of the distinct groups of items separately. In some embodiments, the object recognition system may associate the $\Delta V$ measurement with particular items based on one or a combination of factors, such as by using visual features and shape of the item and/or by using a known shelf location for the item to segment the items. In other embodiments, shelf location and other identifying information may instead be manually programmed into the system.

With the volume measurements determined from steps 506, 508, 510, and 512, at step 514 the camera monitors the region of interest and periodically acquires images of the items. Once the images are acquired, at step 518, the images are analyzed and a real-time volume measurement, $V_{RT}$, is determined therefrom for each of the items in a similar fashion as described previously with relation to equation (4). Using known location information and/or other identifiers for the items as described previously, the system is able to track quantities of the various items on the display.

In some embodiments, the object recognition system may be in further communication with a weigh scale, where the system monitors the scale data for items sold by weight. In some embodiments, the scale data may be used to calibrate the item quantity calculation as determined by the volumetric measurements described with relation to FIGS. 4 and 5. In other embodiments, the scale data may be used to track items sold by weight so that store personnel may be notified when inventory is low for such items.

FIGS. 1-9 illustrate embodiments for an object recognition system configured to track items on display based on image analysis and volumetric measurements without a need to manually count the items and/or use a barcode scanner. It should be understood that the volumetric measurements and calculations provided herein are for illustration purposes only and not meant to be limiting. In other embodiments, different relationships or mathematical tools may be used to determine the volumetric measures from the images without departing from the principles of the disclosed subject matter.

It is intended that subject matter disclosed in any one portion herein can be combined with the subject matter of one or more other portions herein as long as such combinations are not mutually exclusive or inoperable. In addition, many variations, enhancements and modifications of the imager-based optical code reader concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A detection system for tracking items located in a region of interest, the system comprising:
    an imager having a field of view directed onto the region of interest, the imager operable to acquire a first image at a first time and a second image at a second time of the region of interest; and
    a controller in operative communication with the imager, the controller operable to:
        acquire a first set of depth data for a first known quantity of items in the region of interest based on the first image;
        determine a first baseline volume measurement for the first known quantity of items based on the first set of depth data from the first image;
        acquire a second set of depth data for a second known quantity of items in the region of interest based on the second image, wherein the first known quantity of items is less than the second known quantity of items;
        determine a second baseline volume measurement for the second known quantity of items based on the second set of depth data from the second image;
        determine a variance volume measurement based on a difference between the first baseline volume measurement and the second volume measurement;
        convert the variance volume measurement into a variance per unit item based on the variance volume measurement divided by a difference between the second known quantity of items and the first known quantity of items;
        determine a current volume measurement for an unknown quantity of items based on depth data from an additional image acquired by the imager during real-time monitoring of the region of interest; and
        determine a current quantity of items for the unknown quantity of items present at the region of interest based, at least in part, on a difference between the current volume measurement and at least one of the first or second baseline volume measurements divided by the variance per unit item.

2. The detection system of claim 1, further comprising a peripheral device in operable communication with the controller, wherein the controller is further operable to transmit the tallied number of the current quantity of items to the peripheral device.

3. The detection system of claim 1, further comprising a sensor system in operative communication with the imager, the sensor system operable to;
    detect a presence of a person within an activation field of the sensor system and proximate the region of interest; and
    generate an activation signal in response to detecting the presence of the person, and wherein the imager acquires the additional image during real-time monitoring of the region of interest responsive to receiving the activation signal.

4. The detection system of claim 1, wherein the imager is located in an overhead position relative to the region of interest with the field of view projecting downwardly from the imager onto the region of interest.

5. The detection system of claim 4, wherein the imager is a 3D camera.

6. A method for tracking items located in a region of interest, the method comprising:
acquiring, at a first time via an imager having a field of view directed onto the region of interest, a first image of the region of interest;
determining, via a controller, a first set of depth data for a first known quantity of items in the region of interest based on the first image;
determining, via a controller, a first baseline volume measurement for the first known quantity of items based on the first set of depth data from the first image;
acquiring, at a second time via the imager, a second image of the region of interest;
determining, via the controller, a second set of depth data for a second known quantity of items in the region of interest based on the second image, wherein the first known quantity of items is less than the second known quantity of items;
determining, via the controller, a second baseline volume measurement for the second known quantity of items based on the second set of depth data from the second image;
determining, via the controller, a variance volume measurement based on a difference between the first baseline volume measurement and the second volume measurement;
converting, via the controller, the variance volume measurement into a variance per unit item based on the variance volume measurement divided by a difference between the second known quantity of items and the first known quantity of items;
determining, via the controller, a current volume measurement for an unknown quantity of items based on depth data from an additional image acquired by the imager during real-time monitoring of the region of interest; and
determining, via the controller, a current quantity of items for the unknown quantity of items present at the region of interest based, at least in part, on the variance volume measurement divided by the current volume measurement and at least one of the first or second baseline volume measurements divided by the variance per unit item.

7. The method of claim 6, further comprising transmitting, via the controller, the number of the determined current quantity of items to a peripheral device in operable communication with the controller.

8. The method of claim 6, further comprising detecting, via a sensor system in operative communication with the imager, a presence of a person within an activation field of the sensor system.

9. The method of claim 8, further comprising generating, via the sensor system, an activation signal in response to detecting the presence of the person, and wherein acquiring the additional image via the imager during real-time monitoring of the region of interest occurs responsive to receiving the activation signal.

10. The method of claim 6, further comprising identifying, via the controller, each item of the unknown quantity of items from the additional image.

11. The detection system of claim 1, wherein the controller is further operable to update an inventory listing to reflect the current quantity of items present at the region of interest.

12. The detection system of claim 1, wherein the first known quantity of items is zero.

13. The method of claim 6, further comprising updating, via the controller, an inventory listing to reflect the current quantity of items present at the region of interest.

14. The method of claim 6, wherein each determining step and the converting step are performed for different discrete types of items identified within the region of interest to track different groups of item types separately, wherein each item type is associated with a different variance per unit item.

15. The method of claim 14, further comprising identifying different types of items based on at least one of an item shape, shelf location, or a combination thereof.

16. The method of claim 6, wherein:
determining the first baseline volume measurement includes summing all depth values from all x-y pixel coordinates within the region of interest for the first image;
determining the second baseline volume measurement includes summing all depth values from all x-y pixel coordinates within the region of interest for the second image; and
determining the current volume measurement includes summing all depth values from all x-y pixel coordinates within the region of interest for the additional image.

17. The detection system of claim 1, wherein additional images acquired by the imager during real-time monitoring of the region of interest are captured by the imager according to a predetermined interval cycle.

18. The detection system of claim 1, wherein the imager is configured to enter an active state from an inactive state and acquire additional images during real-time monitoring of the region of interest responsive to receiving a signal from a sensor system detecting a person is proximate to the region of interest.

19. The detection system of claim 18, wherein the sensor system includes at least one optical sensor, infrared sensor, acoustic sensor, or pressure sensor located proximate a retail display holding the items or incorporated within a camera system including the imager.

20. The detection system of claim 18, wherein the imager is configured to delay acquiring the additional images during real-time monitoring of the region of interest until after receiving a second signal from the sensor system detecting the person is no longer proximate the region of interest.

* * * * *